(12) United States Patent
Gates et al.

(10) Patent No.: US 7,684,818 B1
(45) Date of Patent: Mar. 23, 2010

(54) SYSTEM AND METHOD FOR FACILITATING COMMUNICATIONS BETWEEN DISTINCT DISPATCH COMMUNICATION SYSTEMS

(75) Inventors: Corey Gates, Mountain View, CA (US); Frank Chu, Mountain View, CA (US)

(73) Assignee: Nextel Communications Inc., Reston, VA (US)

( * ) Notice: Subject to any disclaimer, the term of this patent is extended or adjusted under 35 U.S.C. 154(b) by 866 days.

(21) Appl. No.: 11/360,919

(22) Filed: Feb. 23, 2006

(51) Int. Cl.
 *H04B 7/00* (2006.01)
(52) U.S. Cl. .................. 455/521; 455/518; 455/519; 455/552.1
(58) Field of Classification Search ......... 455/518–521, 455/552.1
 See application file for complete search history.

(56) References Cited

U.S. PATENT DOCUMENTS

2006/0058008 A1* 3/2006 Choksi ................. 455/406
2006/0072517 A1* 4/2006 Barrow et al. ............... 370/335
2006/0212526 A1* 9/2006 Subramanian et al. ....... 709/206

* cited by examiner

*Primary Examiner*—Raymond S Dean (57) ABSTRACT

A dispatch translation server (DTS) translates messages between a first dispatch communication network that uses a first protocol and a second dispatch communication network that uses a second protocol. The messages relate to the setting up of a dispatch communication session, controlling the channel floor of the dispatch communication session, and terminating the dispatch communication session. With regard to controlling the channel floor, dispatch translation server (DTS) translates messages when both the first and second dispatch communication networks use explicit floor control; when the first dispatch communication network uses implicit floor control and the sending party resides therein and the second dispatch communication network uses explicit floor control; when the first dispatch communication network uses explicit floor control and the sending party resides therein and the second dispatch communication network uses implicit floor control; and when both the first and second dispatch communication network use implicit floor control.

25 Claims, 8 Drawing Sheets

FIG. 1

- Dispatch A
    - Source = 192*168*0*1@A.com
    - Target = 571*233*1234@B.com
- Dispatch B
    - Source = frank@A.com
    - Target = corey@B.com

SYSTEM AND METHOD FOR FACILITATING COMMUNICATIONS BETWEEN DISTINCT DISPATCH COMMUNICATION SYSTEMS

FIELD OF THE INVENTION

This invention relates generally to wireless communication systems, and in particular, to a system and method for facilitating communications between distinct dispatch communication systems.

BACKGROUND OF THE INVENTION

Communications by way of wireless dispatch communications has grown substantially over the past several years. This is especially true among certain types of businesses that require short and quick communications among employees. For example, the trucking industry typically requires short and quick communications between drivers and dispatchers in order for the delivery of goods and/or services to operate more smoothly.

Dispatch communications are half-duplex communications. That is, the allocation of the communication channel is to a single transmitting party at a particular time. In other words, only one party to a dispatch communication session has the channel floor for sending communications to the other party or parties to the session. The remaining party or parties do not have the channel floor at that particular time, and therefore, are merely receiving dispatch communications from the party that has the channel floor.

Generally, there are two types of method of controlling the channel floor in a dispatch communication session. These are typically referred to in the relevant art as "explicit floor control" and "implicit floor control." In explicit floor control, explicit messages are generated for requesting and releasing the channel floor. For example, when a client presses the dispatch button on his/her dispatch communication device, the device creates and sends a request for the channel floor to a dispatch server. After the client speaks and releases the dispatch button, the device creates and sends a request to release the channel floor to the dispatch server.

When the dispatch server receives a message requesting the channel floor and the floor is available, the dispatch server grants the floor to the requesting party, and subsequently denies any further requests for the channel floor while the initial requester has the floor. When the dispatch server receives the message requesting a release of the channel floor, the dispatch server opens the channel floor and makes it available to the next party requesting the channel floor.

In an implicit floor control dispatch communication system, there are no messages created for explicitly requesting and releasing the channel floor. When a client presses the dispatch button on his/her dispatch communication device and begins to speak, the dispatch server interprets that as an implicit request for the channel floor. If the channel floor is available, the dispatch server grants the initiating party the channel floor, and subsequently denies any other party's attempt to obtain the channel floor while the initiating party has the floor. When the dispatch server senses that the dispatch communication has ceased after a predetermined time interval, the dispatch server interprets that as an implicit request to release the channel floor, and consequently opens the channel floor and makes it available to any party participating in the communication session.

Dispatch communication systems, and more generally, wireless communication systems including interconnect-based systems, are undergoing major changes. Third and fourth generation systems are undergoing development and/or are being implemented. Many carriers will soon be transitioning their first or second generation systems to third and fourth generation systems. Generally, these carriers will have a transition period where both their earlier generation systems and later generation systems operate simultaneously. Accordingly, some of these carriers will have the need to provide dispatch communications between the earlier generation systems and the later generation systems. In addition, the earlier generation systems may be "explicit floor control" systems and the later generation systems may be "implicit floor control" systems or vice-versa.

SUMMARY OF THE INVENTION

An aspect of the invention relates to a system, comprising a first dispatch communication network; a second dispatch communication network; and a dispatch translation server (DTS) for translating one or more messages between a first protocol used by the first dispatch communication network and a second protocol used by the second dispatch communication network. The one or more messages relate to the setting up of a dispatch communication session, controlling the channel floor of the dispatch communication session, and terminating the dispatch communication session.

With regard to controlling the channel floor, the dispatch translation server (DTS) translates messages when both the first and second dispatch communication networks use explicit floor control; when the first dispatch communication network uses implicit floor control and the sending party resides therein and the second dispatch communication network uses explicit floor control; when the first dispatch communication network uses explicit floor control and the sending party resides therein and the second dispatch communication network uses implicit floor control; and when both the first and second dispatch communication networks use implicit floor control.

In particular, with regard to setting up a dispatch communication session, the dispatch translation server (DTS) is adapted to receive a first invite message from the first dispatch communication network, translate the first invite message to a second invite message, and send the second invite message to the second dispatch communication network. The first invite message is in accordance with a first protocol used by the first dispatch communication network, and includes a first address of a first dispatch client and a second address of a second dispatch client, wherein the first and second addresses are in accordance with the first protocol. The second invite message is in accordance with a second protocol used by the second dispatch communication network, and includes a first address of the first dispatch client and a second address of the second dispatch client, wherein the first and second addresses are in accordance with the second protocol.

Additionally, with regard to setting up a dispatch communication session, the dispatch translation server (DTS) is further adapted to receive a first response to the second invite message from the second dispatch communication network, wherein the first response is in accordance with the second protocol; translate the first response to a second response in accordance with the first protocol; send the second response to the first dispatch communication network; receive a first acknowledge of the second response from the first dispatch communication network, wherein the first acknowledge is in accordance with the first protocol; translate the first acknowledge to a second acknowledge in accordance with the second protocol; and send the second acknowledge to the second dispatch communication network. Also, the dispatch translation server (DTS) is further adapted to receive a first dispatch audio from the first dispatch communication network, wherein the first dispatch audio is in accordance with the first protocol; translate the first dispatch audio to a second dispatch audio in accordance with the second protocol; and send the second dispatch audio to the dispatch communication network.

With regard to controlling the channel floor when the first and second dispatch communication networks use explicit floor control, the dispatch translation server (DTS) is adapted to receive a first floor taken message from the first dispatch communication network, wherein the first floor taken message is in accordance with the first protocol; translate the first floor taken message into a second floor taken message in accordance with the second protocol; and send the second floor taken message to the second dispatch communication network. Also, dispatch translation server (DTS) is adapted to receive a first dispatch audio from the first dispatch communication network, wherein the first dispatch audio is in accordance with the first protocol; translate the first dispatch audio to a second dispatch audio in accordance with the second protocol; and send the second dispatch audio to the second dispatch communication network. In addition, the dispatch translation server (DTS) is adapted to receive a first floor release message from the first dispatch communication network, wherein the first floor release message is in accordance with the first protocol; translate the first floor release message into a second floor release message in accordance with the second protocol; and send the second floor release message to said second dispatch communication network.

With regard to controlling the channel floor when the first dispatch communication network uses implicit floor control (where the sending party resides) and the second dispatch communication networks uses explicit floor control, the dispatch translation server (DTS) is adapted to receive a first dispatch audio from the first dispatch communication network, wherein the first dispatch audio is in accordance with the first protocol; send a floor taken message to the second dispatch communication network in response to receiving the first dispatch audio; translate the first dispatch audio to a second dispatch audio in accordance with the second protocol; and send the second dispatch audio to the second dispatch communication network. The dispatch translation server (DTS) may be further adapted to monitor a current time interval from a cessation of receiving the first dispatch audio and send a floor release detection message to the second dispatch communication network when the current time interval is at or exceeds a predetermined time period.

With regard to controlling the channel floor when the first dispatch communication network uses explicit floor control (where the sending party resides) and the second dispatch communication networks uses implicit floor control, the dispatch translation server (DTS) is adapted to receive a floor taken message from the first dispatch communication network; receive a first dispatch audio from the first dispatch communication network, wherein the first dispatch audio is in accordance with the first protocol; translate the first dispatch audio to a second dispatch audio in accordance with the second protocol; and send the second dispatch audio to the second dispatch communication network. The dispatch translation server (DTS) may be further adapted to receive a floor release message from the first dispatch communication network.

With regard to controlling the channel floor when both the first and second dispatch communication networks use implicit floor control, the dispatch translation server (DTS) is adapted to receive a first dispatch audio from the first dispatch communication network, wherein the first dispatch audio is in accordance with the first protocol; detect that a channel floor has been taken in response to receiving the first dispatch audio; translate the first dispatch audio into a second dispatch audio in accordance with the second protocol; and send the second dispatch audio to the second dispatch communication network. The dispatch translation server (DTS) may further be adapted to monitor a current time interval from a cessation of receiving the first dispatch audio; and detect a release of the channel floor when the current time interval is at or exceeds a predetermined time period.

With regard to terminating a dispatch communication network, the dispatch translation server (DTS) is adapted to receive a first message indicating a termination of a dispatch communication session, wherein the first message is in accordance with the first protocol; translate the first message into a second message in accordance with the second protocol; and send the second message to the second dispatch communication network. The dispatch translation server (DTS) may be further adapted to receive a first response to the second message from the second dispatch communication network, wherein the first response is in accordance with the second protocol; translate the first response to a second response in accordance with the first protocol; and send the second response to the first dispatch communication network.

Other aspects, features, and techniques of the invention will be apparent to one skilled in the relevant art in view of the following detailed description of the exemplary embodiments of the invention.

DETAILED DESCRIPTION OF THE EXEMPLARY EMBODIMENTS

Figure 1:
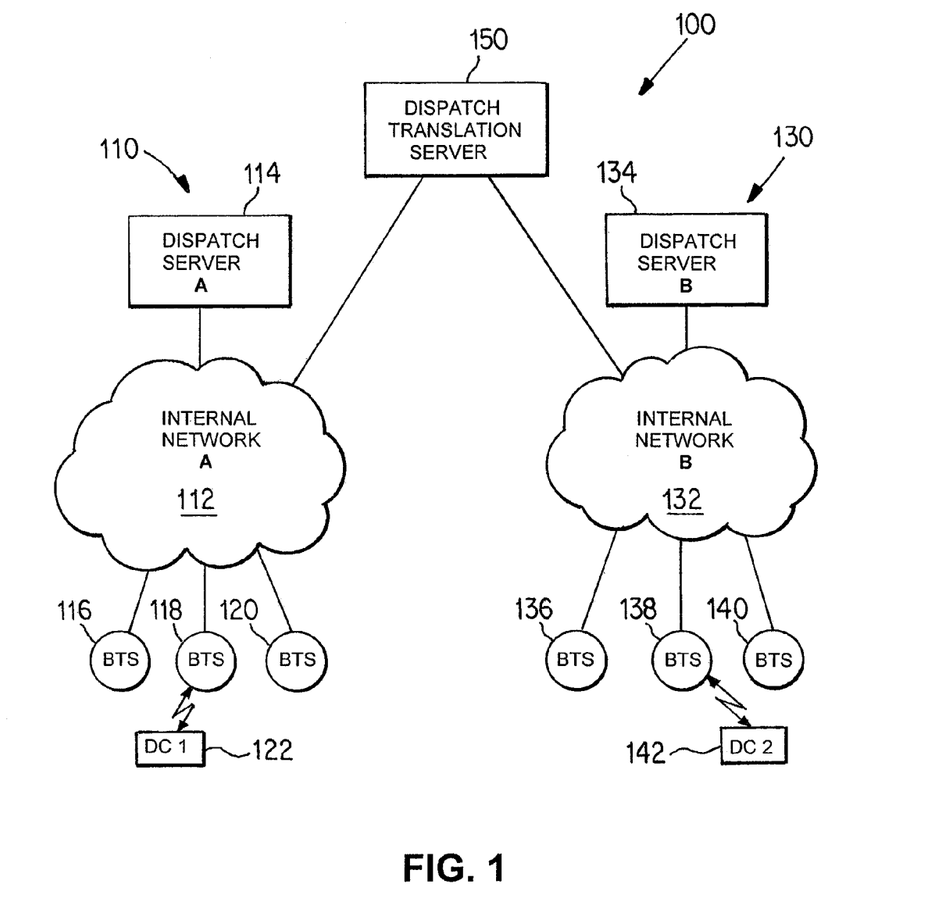
FIG. 1 illustrates a block diagram of an exemplary wireless communication system in accordance with an embodiment of the invention.

FIG. 1 illustrates a block diagram of an exemplary wireless communication system 100 in accordance with an embodiment of the invention. The wireless communication system 100 comprises a first dispatch communication network 110, a second dispatch communication network 130, and a dispatch translation server (DTS) 150. The first dispatch communication network 110, in turn, comprises an internal network A 112, a dispatch server A 114, and a plurality of base transceiver stations (BTS), three (3) of which are shown as BTS 116, 118, and 120. The second dispatch communication network 130, in turn, comprises an internal network B 132, a dispatch server B 134, and a plurality of BTS, three (3) of which are shown as BTS 136, 138, and 140.

The first dispatch communication network 110 provides dispatch communication services to a plurality of dispatch clients (DCs), one of which is shown as DC1 122 assigned to communicate with the network 110 by way of BTS 118. The second dispatch communication network 130 provides dispatch communication services to a plurality of DCs, one of which is shown as DC2 142 assigned to communicate with the network 130 by way of BTS 138. A dispatch client can be any type of communication device capable of communicating via dispatch communications. Such device includes handsets, personal digital assistants (PDAs), laptop computers, and desktop computers. In addition, a dispatch client need not communicate with a network via a BTS, but by way of a wired network as in the case of a dispatch-to-desktop device.

The dispatch server A 114 assists in setting up dispatch communication sessions, controlling the channel floor of the dispatch communication sessions, and terminating dispatch communication sessions. The BTS 116, 118, and 120 provide an interface between the wired internal network A 112 and the wireless medium in which the DCs reside. The internal network A 112 facilitates the transmission of communications between the dispatch server A 114, the BTS 116, 118, and 120, and the dispatch translation server (DTS) 150.

Similarly, the dispatch server B 114 assists in setting up dispatch communication sessions, controlling the channel floor of the dispatch communication sessions, and terminating dispatch communication sessions. The BTS 136, 138, and 140 provide an interface between the wired internal network B 132 and the wireless medium in which the DCs reside. The internal network B 132 facilitates the transmission of communications between the dispatch server B 134, the BTS 136, 138, and 140, and the dispatch translation server (DTS) 150.

The dispatch translation server (DTS) 150 serves to translate messages between the two distinct dispatch communication networks 110 and 130. This is in the case where at least one party to a dispatch communication session resides in the first dispatch communication network 110 and at least another party to the dispatch communication session resides in the second dispatch communication network 130. As discussed in more detail below, messages that are translated by the dispatch translation server 150 relate to setting up a dispatch communication session, controlling the channel floor of the dispatch communication session, and terminating the dispatch communication session.

The following describes an exemplary method of setting up a dispatch communication session between DC1 122 of the first dispatch communication network 110 and DC2 142 of the second dispatch communication network 130; an exemplary method of controlling the channel floor when both the first and second communication networks 110 and 130 use explicit floor control; an exemplary method of controlling the channel floor when the transmitting party (e.g., DC2 142) resides in a dispatch communication network (e.g., network 130) that uses implicit floor control, and the receiving party (e.g., DC1 122) resides in a dispatch communication network (e.g., network 110) that uses explicit floor control; an exemplary method of controlling the channel floor when the transmitting party (e.g., DC1 122) resides in a dispatch communication network (e.g., network 110) that uses explicit floor control, and the receiving party (e.g., DC2 142) resides in a dispatch communication network (e.g., network 130) that uses implicit floor control; an exemplary method of controlling the channel floor when both the first and second communication networks 110 and 130 use implicit floor control; and an exemplary method of terminating a dispatch communication session.

Figure 2:
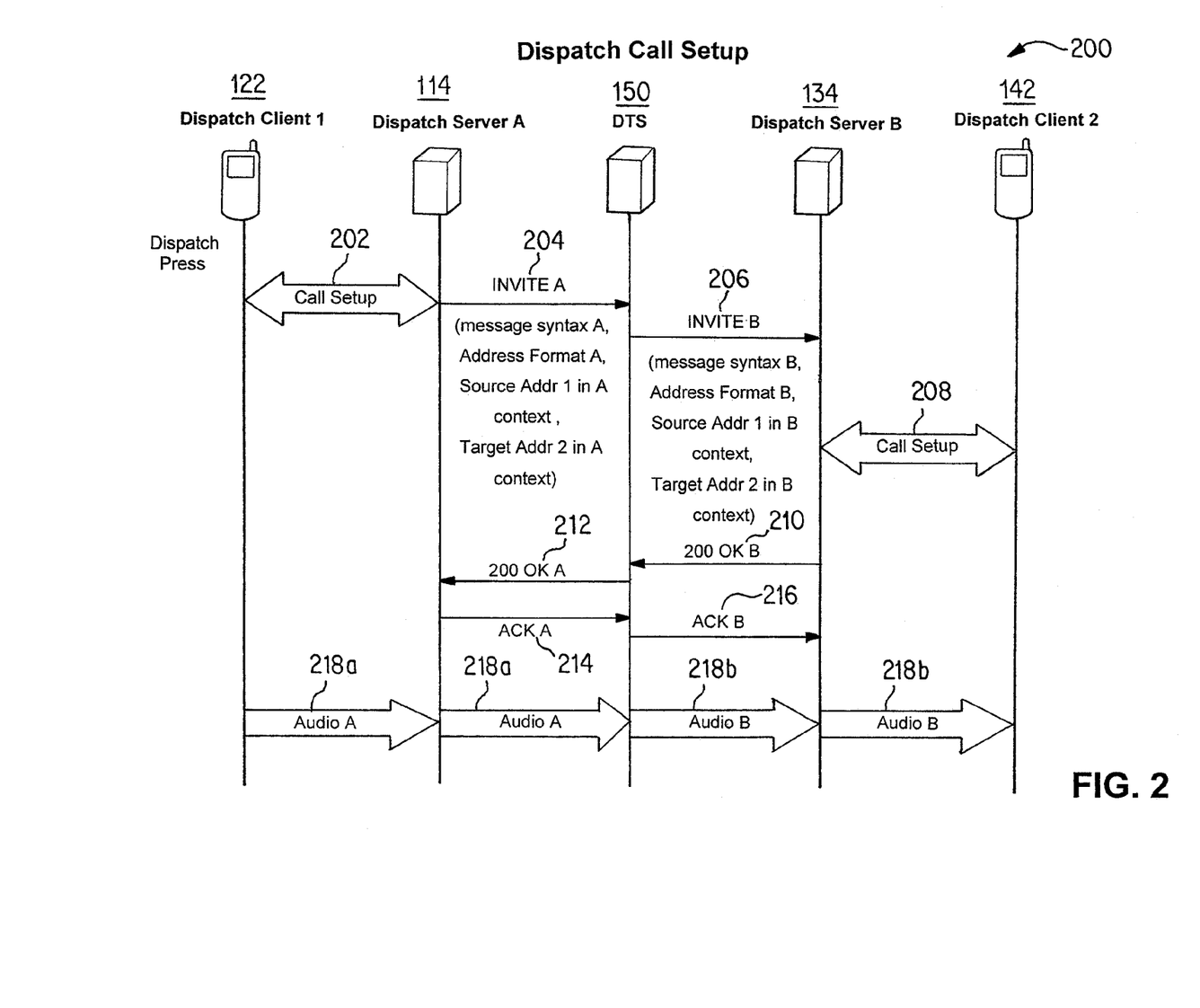
FIG. 2 illustrates a signal flow diagram related to an exemplary method of setting up a dispatch call in accordance with another embodiment of the invention.

FIG. 2 illustrates a signal flow diagram related to an exemplary method 200 of setting up a dispatch call in accordance with another embodiment of the invention. In this example, the DC1 122 desires to establish a dispatch communication session with DC2 142. According to the method 200, the DC1 122 and the dispatch server A 114 perform a dispatch call setup operation 202 in accordance with the protocol used by the first dispatch communication network 110. For example, the DC1 122 may send a dispatch call request to the dispatch server A 114. In response to the dispatch call request, the dispatch server A 114 may send a message back to the DC 1 122 acknowledging receipt of the dispatch call request. In addition, if there are one or more target parties residing in the first dispatch communication network 110, the dispatch server A sends them paging messages to determine whether the one or more target parties are available to participate in the dispatch communication session.

As previously discussed, in this example, at least one of the target parties resides in the second dispatch communication network 130, namely DC2 142. In such a case, the dispatch server A 114 generates an INVITE A message 204 and sends it to the dispatch translation server (DTS) 150. The INVITE A message 204 is configured in the syntax specified by the protocol used by the first dispatch communication network 110 (e.g., in syntax A). Accordingly, the addresses of the source party and the target parties are specified in the protocol used by the first dispatch communication network 110. For example, with reference to FIG. 3, the address of the source party DC1 122 may be 192*168*0*1@A.com, and the address of the target party DC2 142 may be 571*233*1234@B.com. Thus, as this example illustrates, the addresses are in a particular format compliant with the protocol used by the first dispatch communication network 110.

In response to receiving the INVITE A message 204, the dispatch translation server (DTS) 150 generates an INVITE B message 206 and sends it to the dispatch server B 134 of the second dispatch communication network 130. The INVITE B message 206 is configured in the syntax specified by the protocol used by the second dispatch communication network 130 (e.g., in syntax B). Accordingly, the addresses of the source party and the target party are specified in the protocol used by the second dispatch communication network 130. For example, with reference again to FIG. 3, the address of the source party DC1 122 may be frank@A.com, and the address of the target party DC2 142 may be corey@B.com. Thus, as this example illustrates, the addresses are in a particular format compliant with the protocol used by the second dispatch communication network 130.

The dispatch translation server (DTS) 150 may perform the translation of the source and target addresses in a number of ways. For example, the dispatch translation server (DTS) 150 may use a look-up table stored in a local memory to perform the translation of the addresses between the respective protocols used by the first and second dispatch communication networks 110 and 130. In the example shown in FIG. 3, the dispatch translation server (DTS) 150 uses the look-up table to map the source address of 192*168*0*1@A.com to frank@A.com, and the target address of 571*233*1234@B.com to corey@B.com.

There may be some cases where the look-up table does not contain the corresponding source and target addresses in the protocol of the target dispatch communication network. In such a case, the dispatch translation server (DTS) 150 may dynamically assign an address. The dispatch translation server (DTS) 150 may contain a range of addresses for dynamically assigning to source and/or target addresses. Taking again the example shown in FIG. 3, if the look-up table does not contain a corresponding address for the source address of 192*163*0*1@A.com, the dispatch translation server (DTS) 150 may dynamically assign an address in the protocol used by the second dispatch communication network 130 (e.g., 100111@A.com). Similarly, if the look-up table does not contain a corresponding address for the target address of 571*233*1234@B.com, the dispatch translation server (DTS) 150 may dynamically assign an address in the protocol used by the second dispatch communication network 130 (e.g., 100151@A.com).

Figure 3:
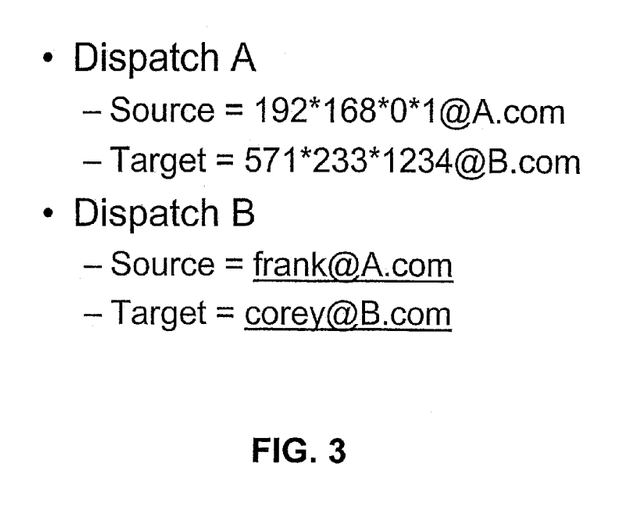
FIG. 3 illustrates exemplary client addresses for two distinct dispatch communication systems in accordance with another embodiment of the invention.

The dynamic assignment of the source address is useful in the case where the target party wants to call back the source party after the initial dispatch communication session is terminated. In this case, the dynamic translation server (DTS) 150 now has the information to map the addresses of the source party. The dynamically assigned address may be temporary; that is, valid for a predetermined time period. Or, the dynamically assigned address may also be permanent.

In response to receiving the INVITE B message 206, the dispatch server B 134 performs a call setup operation 208 with the target party DC2 142 in accordance with the protocol used by the second dispatch communication network 130. For example, the dispatch server B 134 may send a paging message to the target party DC2 142. If the target party DC2 142 is available, the target party DC2 142 sends a page response message to the dispatch server B 134. In response to receiving the page response message from the target party DC2 142, the dispatch server B 134 establishes a dispatch communication session with the target party DC2 142 by allocating the necessary resources.

After setting up the dispatch communication session, the dispatch server B 134 sends a message 210 (e.g., a 200 OK B) to the dispatch translation server (DTS) 150 acknowledging that the target party DC2 142 is available for the dispatch communication session requested by the source party DC1 122. In response to receiving the 200 OK B message 210, the dispatch translation server (DTS) 150 generates a 200 OK A message 212 and sends it to the dispatch server A 114. In response to receiving the 200 OK A message 212, the dispatch server A 114 generates an ACK A message 214 and sends it to the dispatch translation server (DTS) 150. In response to receiving the ACK A message 214, the dispatch translation server (DTS) 150 sends an ACK B message 216 and sends it to the dispatch server B 134.

After the dispatch translation server (DTS) 150 sends the ACK B message 216 to the dispatch server B 134, the dispatch communication session between the source party DC1 122 and the target party DC2 142 is set up. Now, both parties can send dispatch communications to each other. In this regards, for example, the source party DC1 122 sends a dispatch audio A 218a to the dispatch server A 114. In response, the dispatch server A 144 forwards the dispatch audio 218a to the dispatch translation server (DTS) 150. In response, the dispatch translation server (DTS) 150 translates the dispatch audio A 218a into dispatch audio B 218b, which is compliant for transmission within the second dispatch communication network 130. The dispatch translation server (DTS) 150 then sends the dispatch audio B 218b to the dispatch server B 134 which, in turn, forwards the dispatch audio B 218b to the target party DC2 142. Dispatch communications from the target party DC2 142 to the source party DC1 122 operates in the same way, except in the opposite direction.

Figure 4:
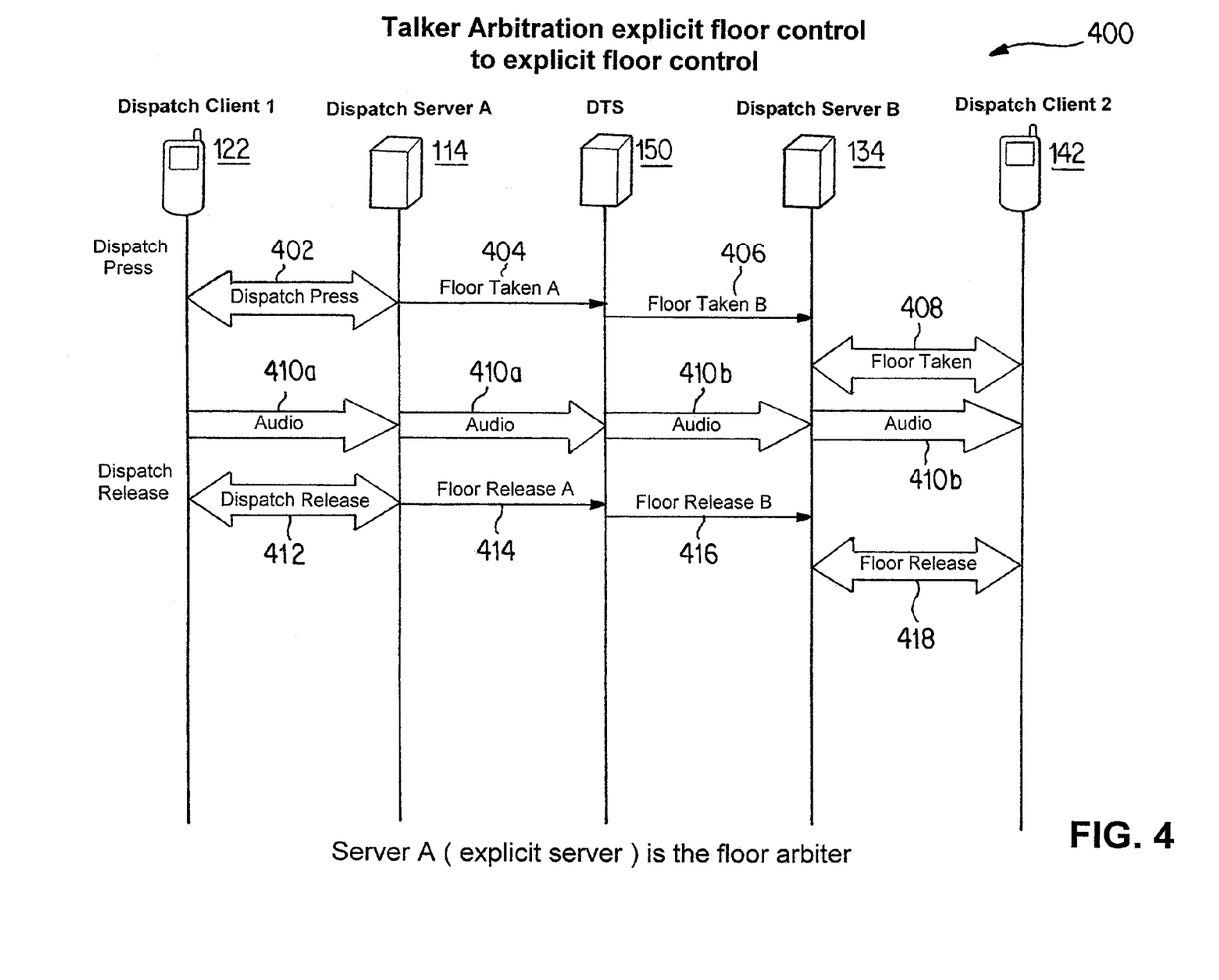
FIG. 4 illustrates a signal flow diagram related to an exemplary method of controlling a dispatch channel floor when both distinct dispatch communication systems use explicit floor control in accordance with another embodiment of the invention.

FIG. 4 illustrates a signal flow diagram related to an exemplary method 400 of controlling a dispatch channel floor in accordance with another embodiment of the invention. In this example, both the first and second dispatch communication networks 110 and 130 use explicit messages for controlling the channel floor of a dispatch communication session. The explicit channel floor control messages, for example, include a "floor taken" message for acquiring the channel floor by the transmitting party, and a "floor release" message for releasing the channel floor by the transmitting party. Also, in this example, a dispatch communication session has already been set up between the parties DC1 122 and DC2 142. In addition, in this example, the transmitting party DC1 122 to the dispatch communication session will be initiating the floor control request, and releasing the floor control as well.

According to the method 400, in response to the user of DC1 122 pressing the dispatch button on the device, the DC1 122 and the dispatch server A 114 trade one or more messages 402 relating to the pressing of the dispatch button on the device. These one or more messages 402 comply with the protocol used by the first dispatch communication network 110. For example, the one or more messages 402 may include a channel floor request message sent by the DC1 122 to the dispatch server A 114, and a channel floor grant message (if the channel floor is available) sent by the dispatch server A 114 to the DC1 122.

In response to the dispatch button being pressed by the user of DC1 122, the dispatch server A 114 generates a Floor Taken A message 404, and sends it to the dispatch translation server (DTS) 150. The Floor Taken A message 404 is compliant with the protocol used by the first dispatch communication network 110. In response to receiving the Floor Taken A message 404, the dispatch translation server (DTS) 150 generates a Floor Taken B message 406, and sends it to the dispatch server B 134. The Floor Taken B message 406 is compliant with the protocol used by the second dispatch communication network 130.

In response to receiving the Floor Taken B message 406, the dispatch server B 134 trades one or more messages 408 with the DC2 142 that relate to the taking of the channel floor by the DC1 122. These one or more message 408 are compliant with the protocol used by the second dispatch communication network 130.

After the transmission of the one or more floor taken messages 408, the DC1 122 has the channel floor of the dispatch communication session. Accordingly, the DC1 122 is able to send a dispatch audio 410a to the dispatch server A 114 which, in turn, forwards the dispatch audio 410a to the dispatch translation server (DTS) 150. The dispatch translation server (DTS) 150 translates the dispatch audio 410a to a dispatch audio 410b that is compliant with the protocol used by the second dispatch communication network 130. The dispatch translation server (DTS) 150 then sends the converted dispatch audio 410b to the dispatch server B 134 which, in turn, forwards the dispatch audio 410b to the DC2 142.

After the DC1 122 has sent the dispatch audio 410a and its user releases the dispatch button, the DC1 122 and dispatch server A 114 trade one or more messages 412 that indicate that the DC1 122 is releasing the channel floor. The one or more messages 412 are compliant with the protocol used by the first dispatch communication network 110. In response to the messages 412, the dispatch server A 114 generates a Floor Release A message 414, and sends it to the dispatch translation server (DTS) 150. In response to receiving the Floor Release A message 414, the dispatch translation server (DTS) 150 generates a Floor Release B message 416 and sends it to the dispatch server B 134. In response to receiving the Floor Release B message 416, the dispatch server B 134 and DC2 142 trade one or more messages 418 that indicate the release of the channel floor by DC1 122. The one or more messages 418 are compliant with the protocol used by the second communication network 130.

Figure 5:
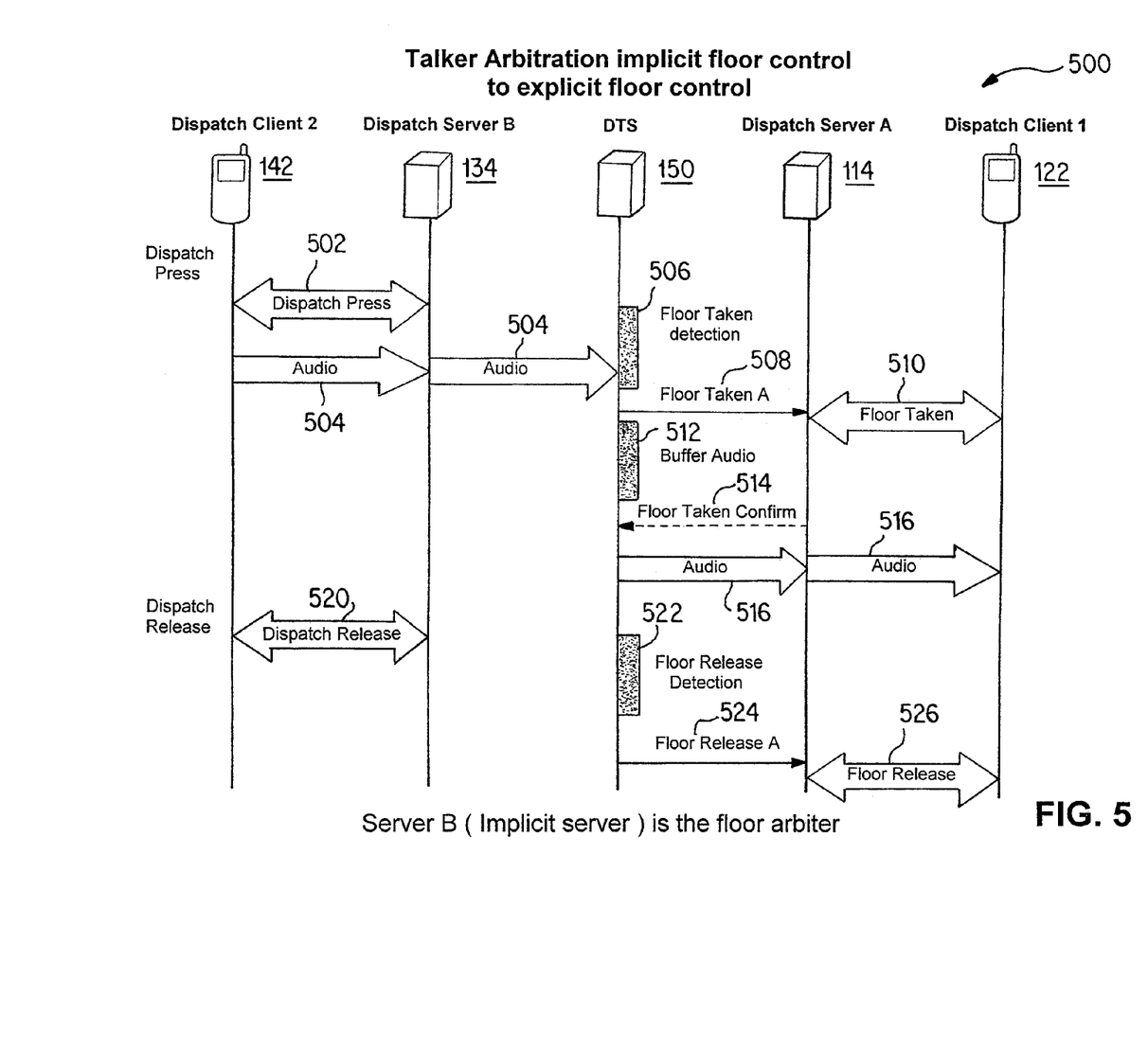
FIG. 5 illustrates a signal flow diagram related to an exemplary method of controlling a dispatch channel floor when the sender's dispatch communication system uses implicit floor control and the recipient's dispatch communication system uses explicit floor control in accordance with another embodiment of the invention.

FIG. 5 illustrates a signal flow diagram related to an exemplary method 500 of controlling a dispatch channel floor in accordance with another embodiment of the invention. In this example, the first dispatch communication network 110 uses explicit messages for controlling the channel floor of a dispatch communication session. However, the second dispatch communication network 130 uses implicit channel floor control. In an implicit floor control, there is no generation of a specific message to request or release the channel floor. Also, in this example, a dispatch communication session has already been set up between the parties DC1 122 and DC2 142. In addition, in this example, the party DC2 142 to the dispatch communication session will be initiating the floor control request, and releasing the floor control as well. As discussed below, in this example, the dispatch server B 134 serves as the channel floor arbiter.

According to the method 500, in response to the user of DC2 142 pressing the dispatch button, the DC2 142 and the dispatch server B 134 trade one or more messages 502 related to the pressing of the dispatch button of DC2 142. The one or more messages 502 comply with the protocol used by the second dispatch communication network 130. After the pressing of the dispatch button, the DC2 142 generates dispatch audio 504 and sends it to the dispatch server B 134. The dispatch server B 134, in turn, forwards the dispatch audio 504 to the dispatch translation server (DTS) 150.

In response to receiving the dispatch audio 504, the dispatch translation server (DTS) 150 detects 506 that the channel floor has been taken by the DC2 142. In response to detecting that the channel floor has been taken, the dispatch translation server (DTS) 150 generates a Floor Taken A message 508, and sends it to the dispatch server A 114. In response to receiving the Floor Taken A message 508, the dispatch server A 114 and the DC1 122 trade one or more messages 510 to indicate that the channel floor of the dispatch communication session has been taken. The one or more messages 510 are in accordance with the protocol used by the first dispatch communication network 110.

Before receiving a confirmation that the channel floor has been taken from the dispatch server A 114, the dispatch translation server (DTS) 150 buffers 512 the audio 504 received from the dispatch server B 134. After the dispatch translation server (DTS) 150 receives the Floor Taken Confirm message 514 from the dispatch server A 114, the dispatch translation server (DTS) 150 sends the audio 516 it has received and buffered to the dispatch server A 114. The dispatch translation server (DTS) 150 configures the audio 516 for transmission within the dispatch communication network 110 in accordance with its protocol. The dispatch server A 114, in turn, forwards the audio 516 to the DC1 122. It shall be understood that the dispatch translation server (DTS) 150 may convert the received audio 504 to the audio 516, and buffer the converted audio 516 as discussed above.

After the user of DC2 142 completes sending the dispatch audio 504, the user releases the dispatch button. In response to the dispatch button being released, the DC2 142 and the dispatch server B 134 trade one or more messages 520 to indicate the release of the channel floor by DC2 142. After a predetermined time period of not receiving the dispatch audio 504, the dispatch translation server (DTS) 150 detects the release of the channel floor 522. In response to detecting the release of the channel floor 522, the dispatch translation server (DTS) 150 generates a Floor Release A message 524 and sends it to the dispatch server A 114. In response to receiving the Floor Release A message 524, the dispatch server A 114 and DC1 122 trade one or more messages 526 that indicate the release of the channel floor. The one or more messages 526 are in accordance with the protocol used by the first dispatch communication network 110.

Figure 6:
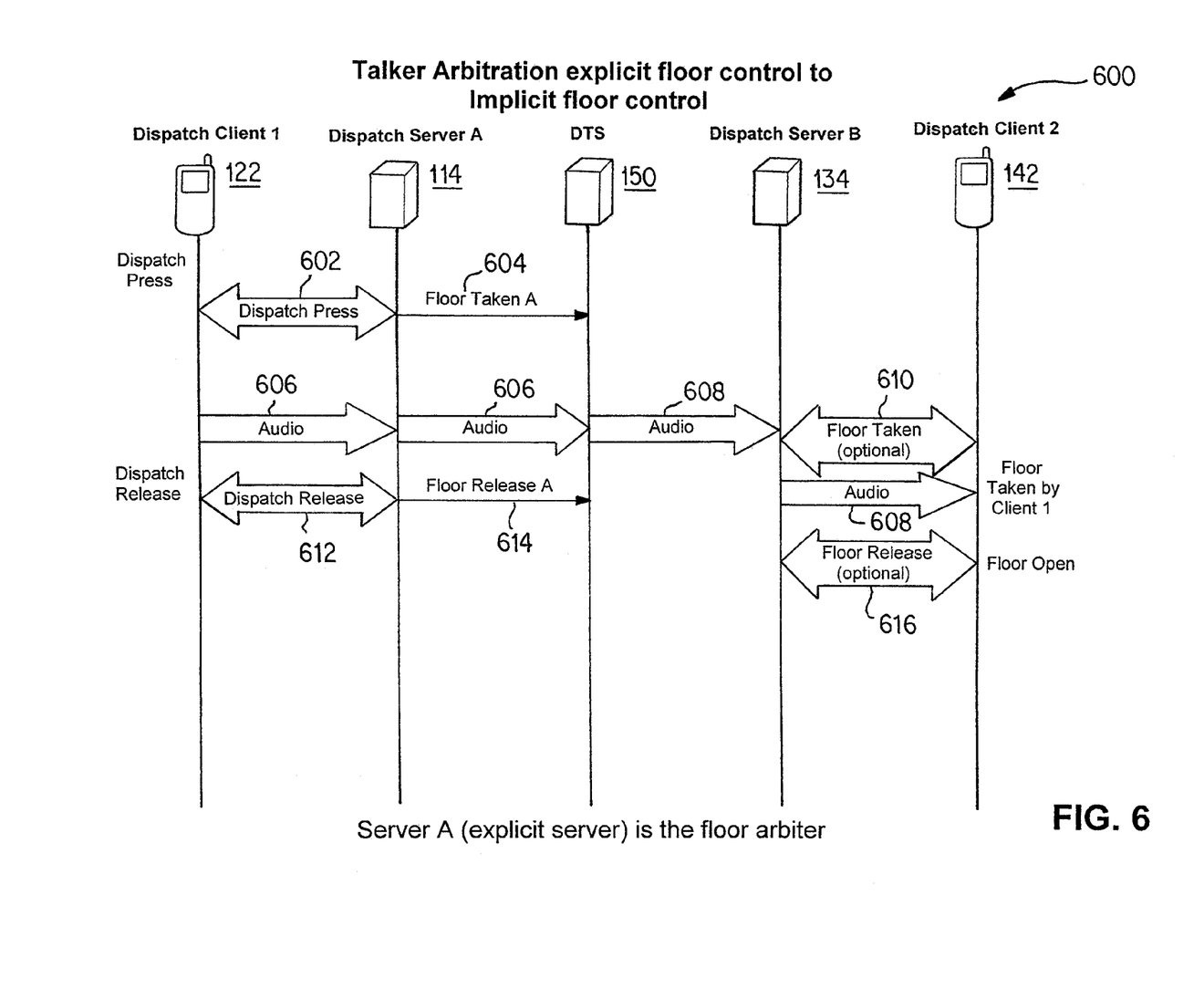
FIG. 6 illustrates a signal flow diagram related to an exemplary method of controlling a dispatch channel floor when the sender's dispatch communication system uses explicit floor control and the recipient's dispatch communication system uses implicit floor control in accordance with another embodiment of the invention.

FIG. 6 illustrates a signal flow diagram related to another exemplary method 600 of controlling a dispatch channel floor in accordance with another embodiment of the invention. In this example, the first dispatch communication network 110 uses explicit messages for controlling the channel floor of a dispatch communication session. And, the second dispatch communication network 130 uses implicit channel floor control. Also, in this example, a dispatch communication session has already been set up between the parties DC1 122 and DC2 142. In addition, in this example, the party DC1 122 to the dispatch communication session is initiating the floor control request, and releasing the floor control as well. As discussed below, in this example, dispatch server A 114 serves as the channel floor arbiter.

According to the method 600, in response to the user of DC1 122 pressing the dispatch button, the DC1 122 and the dispatch server A 114 trade one or more messages 602 relating to the pressing of the dispatch button of the DC1 122. The one or more messages 602 comply with the protocol used by the first dispatch communication network 110. The dispatch server A 114 then generates a Floor Taken A message 604 and sends it to the dispatch translation server (DTS) 150. The DC1 122 then sends dispatch audio 606 to the dispatch server A 114 which, in turn, forwards the dispatch audio 606 to the dispatch translation server (DTS) 150. The dispatch translation server (DTS) 150 configures the audio for transmission via the second dispatch communication network 130, and sends the configured dispatch audio 608 to the dispatch server B 134. The dispatch server B 134 and DC2 142 may optionally trade one or more messages 610 that indicate that the channel floor has been taken. The one or more messages 610 are in accordance with the protocol used by the second dispatch communication network 130. The dispatch server B 134 then forwards the dispatch audio 608 to the receiving party DC2 142.

After the transmitting party DC1 122 completes sending the dispatch audio 606, and releases the dispatch button, the DC1 122 and the dispatch server A 114 trade one or more messages 612 that indicate the release of the dispatch button by DC1 122. The one or more messages 612 are in accordance with the protocol used by the first dispatch communication network 110. In response to the one or more messages 612, the dispatch server A 114 generates a Floor Release A message 614 and sends it to the dispatch translation server (DTS) 150. After a predetermined time period of not receiving dispatch audio from the dispatch translation server (DTS) 150, the dispatch server B 134 may optionally trade one or more messages 616 with the receiving party DC2 142 to indicate the release of the channel floor. The one or more messages 616 are in accordance with the protocol used by the second dispatch communication network 130.

Figure 7:
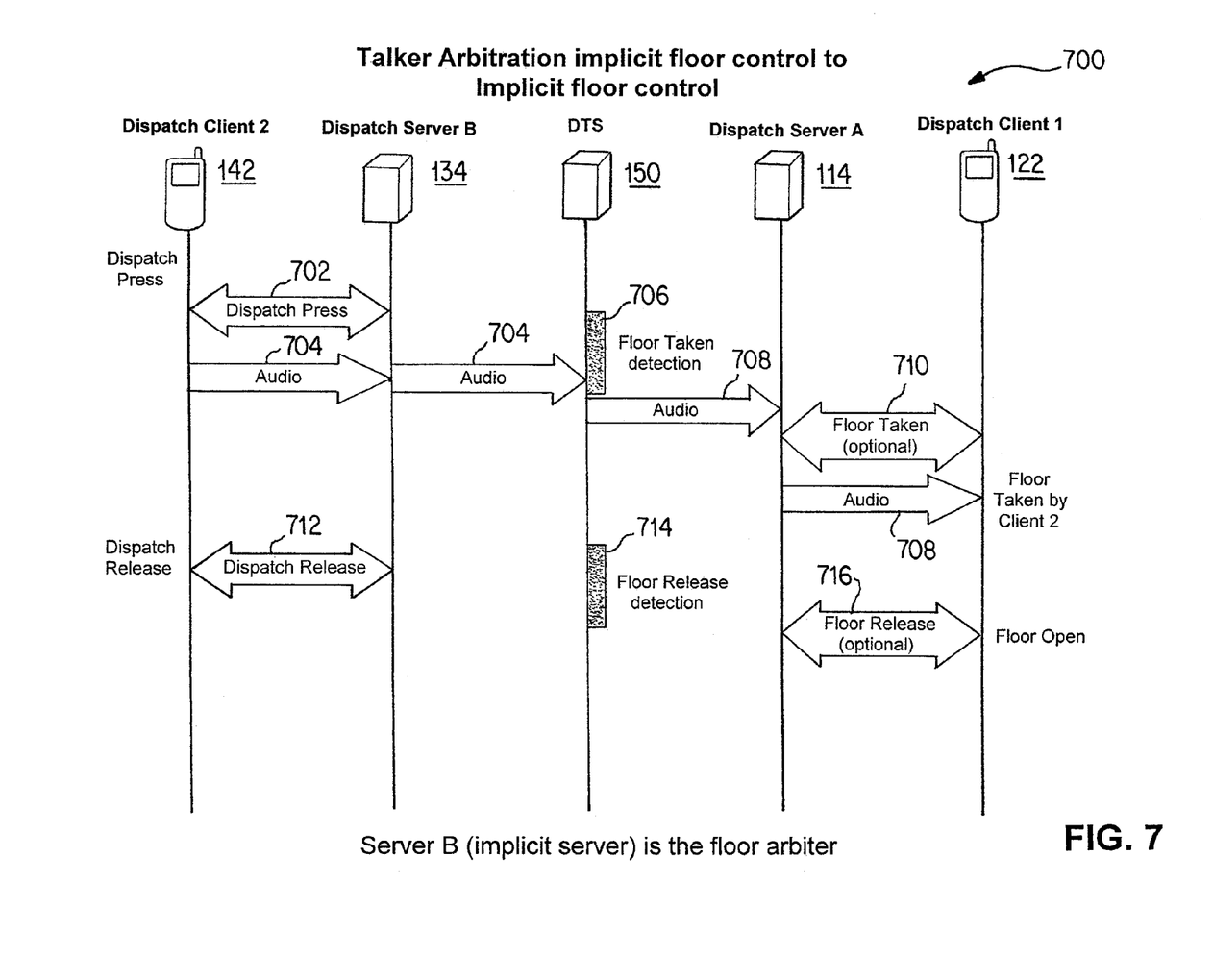
FIG. 7 illustrates a signal flow diagram related to an exemplary method of controlling a dispatch channel floor when both distinct dispatch communication systems use implicit floor control in accordance with another embodiment of the invention.

FIG. 7 illustrates a signal flow diagram of another exemplary method 700 of controlling a dispatch channel floor in accordance with another embodiment of the invention. In this example, both first and second dispatch communication networks 110 and 130 use implicit floor control methods for controlling the channel floor of a dispatch communication session. Also, in this example, a dispatch communication session has already been set up between the parties DC1 122 and DC2 142. In addition, in this example, the party DC2 142 to the dispatch communication session is initiating the floor control request, and releasing the floor control as well. As will be discussed, in this example, dispatch server B 142 serves as the channel floor arbiter.

According to the method 700, in response to the user of DC2 142 pressing the dispatch button, the DC2 122 and the dispatch server B 134 trade one or more messages 702 relating to the pressing of the dispatch button of the DC2 142. The one or more messages 702 comply with the protocol used by the second dispatch communication network 130. The DC2 142 then sends dispatch audio 704 to the dispatch server B 134 which, in turn, forwards the dispatch audio 704 to the dispatch translation server (DTS) 150. In receiving the dispatch audio 704, the dispatch translation server (DTS) 150 detects 706 that the channel floor has been taken.

Once the dispatch translation server (DTS) 150 detects 706 that the channel floor has been taken, the dispatch translation server (DTS) 150 configures the dispatch audio for transmission via the first dispatch communication network 110, and sends the configured dispatch audio 708 to the dispatch server A 114. In response to receiving the dispatch audio 708, the dispatch server A 114 and the DC1 122 may trade one or more messages 710 that indicate that the channel floor has been taken. The one or more messages 710 are in accordance with the protocol used by the first dispatch communication network 110. The dispatch server A 114 then forwards the dispatch audio 708 to the receiving party DC1 122.

After the sending party DC2 142 completes sending the dispatch audio 704, and releases the dispatch button, the transmitting party DC2 142 and the dispatch server B 134 trade one or more messages 712 that indicate the release of the dispatch button by DC2 142. The one or more messages 712 are in accordance with the protocol used by the second dispatch communication network 130. After a predetermined time period of not receiving dispatch audio from the dispatch server B 134, the dispatch translation server (DTS) 150 detects 714 the release of the channel floor 714. Optionally, the dispatch server A 114 may also detect the release of the channel floor after a predetermined time period of the cessation of receiving the dispatch audio 708, and optionally trade one or more messages with the receiving party DC1 122 in accordance with the protocol used by the first dispatch communication network 110.

Figure 8:
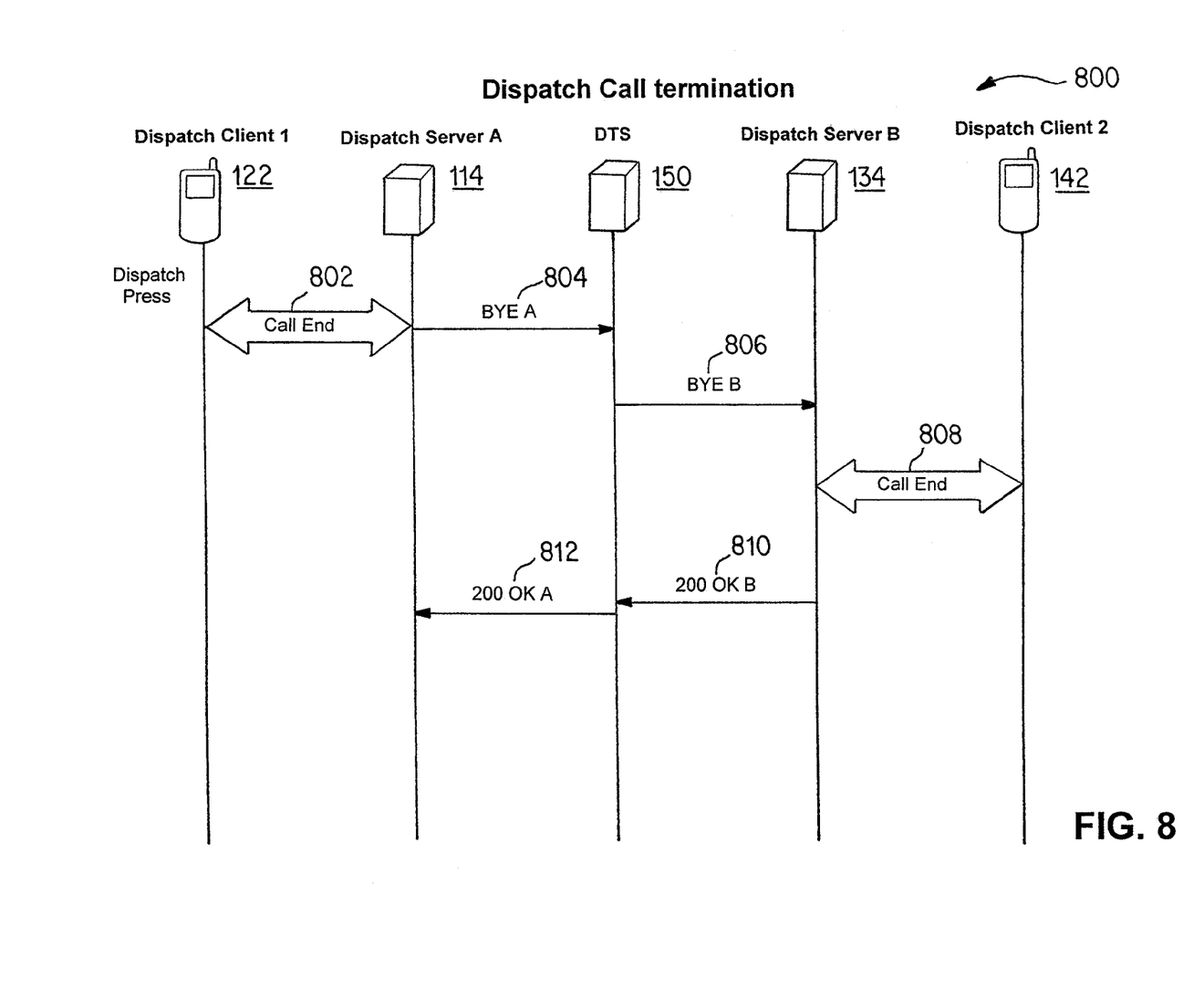
FIG. 8 illustrates a signal flow diagram related to an exemplary method of terminating a dispatch call in accordance with another embodiment of the invention.

FIG. 8 illustrates a signal flow diagram related to an exemplary method 800 of terminating a dispatch communication session in accordance with another embodiment of the invention. According to the method 800, the DC 1 122 and/or dispatch server A 114 perform a call end operation 802 in accordance with the protocol used by the first dispatch communication network 110. In response to the call end operation 802, the dispatch server A 114 generates a BYE A message 804 and sends it to the dispatch translation server (DTS) 150.

In response to receiving the BYE A message 804, the dispatch translation server (DTS) 150 generates a BYE B message 806 and sends it to the dispatch server B 134. In response to receiving the BYE B message 806, the dispatch server B 134 and the DC2 142 perform a call end operation 808 in accordance with the protocol used by the second dispatch communication network 130. Once the call end operation 808 is completed, the dispatch server B 134 generates a 200 OK B message 810 and sends it to the dispatch translation server (DTS) 150. In response to receiving the 200 OK B message 810, the dispatch translation server (DTS) 150 generates a 200 OK A message 812 and sends it to the dispatch server A 114.

While the invention has been described in connection with an exemplary embodiment, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A system, comprising:
a first dispatch communication network;
a second dispatch communication network; and
a dispatch translation server (DTS) that translates one or more messages between a first protocol used by the first dispatch communication network and a second protocol used by the second dispatch communication network,
wherein the one or more messages relate to control of the floor for dispatch communications between the first dispatch network and the second dispatch network.

2. A system, comprising:
a first dispatch communication network;
a second dispatch communication network, and
a dispatch translation server (DTS) that translates one or more messages between a first protocol used by the first dispatch communication network and a second protocol used by the second dispatch communication network,
wherein the one or more messages relate to a set up of a dispatch communication session between a first dispatch client of the first dispatch communication network and a second dispatch client of the second dispatch communication network, and
wherein the one or more messages comprise a first invite message received from the first dispatch communication network, and wherein the dispatch translation server (DTS) translates the first invite message to a second invite message and sends the second invite message to the second dispatch communication network.

3. The system of claim 2, wherein the first invite message includes a first address of the first dispatch client and a second address of the second dispatch client, wherein the first and second addresses are in accordance with the first protocol.

4. The system of claim 2, wherein the second invite message includes a first address of the first dispatch client and a second address of the second dispatch client, wherein the first and second addresses are in accordance with the second protocol.

5. The system of claim 2, wherein the first invite message includes a first address of the first dispatch client and a second address of the second dispatch client, wherein the first and second addresses are in accordance with the first protocol, and wherein the second invite message includes a third address of the first dispatch client and a fourth address of the second dispatch client, wherein the third and fourth addresses are in accordance with the second protocol.

6. The system of claim 5, wherein the dispatch translation server (DTS) is configured to use a look-up table to determine said third and/or fourth addresses.

7. The system of claim 5, wherein the dispatch translation server (DTS) is configured to dynamically assign said third and/or fourth addresses.

8. The system of claim 2, wherein the dispatch translation server (DTS) is configured to:
receive a first response to the second invite message from the second dispatch communication network, wherein the first response is in accordance with the second protocol;
generate a second response in response to the first response wherein the second response is in accordance with the first protocol;
send the second response to the first dispatch communication network;
receive a first acknowledge of the second response from the first dispatch communication network, wherein the first acknowledge is in accordance with the first protocol;
generate a second acknowledge in response to the first acknowledge, wherein the second acknowledge is in accordance with the second protocol; and
send the second acknowledge to the second dispatch communication network.

9. The system of claim 8, wherein the dispatch translation server (DTS) is further configured to:
receive a first dispatch audio from the first dispatch communication network, wherein the first dispatch audio is in accordance with the first protocol;
translate the first dispatch audio to a second dispatch audio in accordance with the second protocol; and
send the second dispatch audio to the second dispatch communication network.

10. The system of claim 1, wherein the first and second dispatch communication networks use an explicit floor control.

11. The system of claim 10, wherein the dispatch translation server (DTS) is configured to:
receive a first floor taken message from the first dispatch communication network, wherein the first floor taken message is in accordance with the first protocol;
translate the first floor taken message into a second floor taken message in accordance with the second protocol; and
send the second floor taken message to the second dispatch communication network.

12. The system of claim 11, wherein the dispatch translation server (DTS) is configured to:
receive a first dispatch audio from the first dispatch communication network, wherein the first dispatch audio is in accordance with the first protocol;
translate the first dispatch audio to a second dispatch audio in accordance with the second protocol; and
send the second dispatch audio to the second dispatch communication network.

13. The system of claim 12, wherein the dispatch translation server (DTS) is configured to:
receive a first floor release message from the first dispatch communication network, wherein the first floor release message is in accordance with the first protocol;
translate the first floor release message into a second floor release message in accordance with the second protocol; and
send the second floor release message to the second dispatch communication network.

14. A system, comprising:
a first dispatch communication network;
a second dispatch communication network; and
a dispatch translation server (DTS) that translates one or more messages between a first protocol used by the first dispatch communication network and a second protocol used by the second dispatch communication network,
wherein the one or more messages relate to control of the floor for dispatch communications between the first dispatch network and the second dispatch network,
wherein the first dispatch communication network uses implicit floor control and the second dispatch communication networks uses explicit floor control.

15. The system of claim 14, wherein the dispatch translation server (DTS) is configured to:
receive a first dispatch audio from the first dispatch communication network, wherein the first dispatch audio is in accordance with the first protocol;
send a floor taken message to the second dispatch communication network in response to receiving the first dispatch audio;
translate the first dispatch audio to a second dispatch audio in accordance with the second protocol; and
send the second dispatch audio to the second dispatch communication network.

16. The system of claim 15, wherein the dispatch translation server (DTS) is configured to:
buffer the first dispatch audio and/or the second dispatch audio; and
send the second dispatch audio to the second dispatch communication network in response to receiving a floor taken confirmation message from the second dispatch communication network.

17. The system of claim 15, wherein the dispatch translation server (DTS) is configured to:
monitor a current time interval from a cessation of receiving the first dispatch audio; and
send a floor release detection message to the second dispatch communication network when the current time interval is at or exceeds a predetermined time period.

18. The system of claim 1, wherein the first dispatch communication network uses explicit floor control and the second dispatch communication networks uses implicit floor control.

19. The system of claim 18, wherein the dispatch translation server (DTS) is configured to:
receive a floor taken message from the first dispatch communication network;
receive a first dispatch audio from the first dispatch communication network, wherein the first dispatch audio is in accordance with the first protocol;
translate the first dispatch audio to a second dispatch audio in accordance with the second protocol; and
send the second dispatch audio to the second dispatch communication network.

20. The system of claim 19, wherein the dispatch translation server (DTS) is configured to receive a floor release message from the first dispatch communication network.

21. The system of claim 1, wherein the first and second dispatch communication networks use implicit floor control.

22. The system of claim 21, wherein the dispatch translation server (DTS) is configured to:
receive a first dispatch audio from the first dispatch communication network, wherein the first dispatch audio is in accordance with the first protocol;
detect that a channel floor has been taken in response to receiving the first dispatch audio;
translate the first dispatch audio into a second dispatch audio in accordance with the second protocol; and
send the second dispatch audio to the second dispatch communication network.

23. The system of claim 22, wherein the dispatch translation server (DTS) is configured to:
- monitor a current time interval from a cessation of receiving the first dispatch audio; and
- detect a release of the channel floor when the current time interval is at or exceeds a predetermined time period.

24. The system of claim 1, wherein the dispatch translation server (DTS) is configured to:
- receive a first message indicating a termination of a dispatch communication session, wherein the first message is in accordance with the first protocol;
- translate the first message into a second message in accordance with the second protocol; and
- send the second message to the second dispatch communication network.

25. The system of claim 24, wherein the dispatch translation server is configured to:
- receive a first response to the second message from the second dispatch communication network, wherein the first response is in accordance with the second protocol;
- translate the first response into a second response in accordance with the first protocol; and
- send the second response to the first dispatch communication network.

* * * * *